United States Patent
Xu et al.

(10) Patent No.: US 10,446,112 B2
(45) Date of Patent: Oct. 15, 2019

(54) ELECTRONIC DEVICES HAVING LIGHT SENSORS WITH THIN-FILM FILTERS

(71) Applicant: Apple Inc., Cupertino, CA (US)

(72) Inventors: Tingjun Xu, San Jose, CA (US); Ove Lyngnes, Carmel Valley, CA (US); Avery P. Yuen, San Jose, CA (US); Xianwei Zhao, Fremont, CA (US); Sunggu Kang, San Jose, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/710,657

(22) Filed: Sep. 20, 2017

(65) Prior Publication Data
US 2019/0088234 A1 Mar. 21, 2019

(51) Int. Cl.
| | |
|---|---|
| *G09G 5/02* | (2006.01) |
| *G09G 5/28* | (2006.01) |
| *G02B 5/28* | (2006.01) |
| *F21V 8/00* | (2006.01) |

(52) U.S. Cl.
CPC ........... *G09G 5/024* (2013.01); *G02B 5/285* (2013.01); *G02B 6/002* (2013.01); *G02B 6/005* (2013.01); *G02B 6/0018* (2013.01); *G02B 6/0028* (2013.01); *G02B 6/0053* (2013.01); *G02B 6/0065* (2013.01); *G02B 6/0076* (2013.01); *G02B 6/0088* (2013.01)

(58) Field of Classification Search
CPC combination set(s) only.
See application file for complete search history.

(56) References Cited

U.S. PATENT DOCUMENTS

| | | | |
|---|---|---|---|
| 6,342,970 B1 | 1/2002 | Sperger et al. | |
| 8,523,419 B2 * | 9/2013 | Nevitt | G02B 6/0068 362/301 |
| 9,268,074 B2 | 2/2016 | Nagato et al. | |
| 9,634,145 B2 | 4/2017 | Ellinger et al. | |
| 9,645,464 B2 | 5/2017 | Yang et al. | |
| 2004/0095645 A1 | 5/2004 | Pellicori et al. | |
| 2011/0255303 A1 * | 10/2011 | Nichol | G02B 6/006 362/606 |
| 2015/0253487 A1 * | 9/2015 | Nichol | G02B 6/0036 362/610 |

* cited by examiner

*Primary Examiner* — Kwin Xie
(74) *Attorney, Agent, or Firm* — Treyz Law Group, P.C.; G. Victor Treyz; Michael H. Lyons (57) ABSTRACT

An electronic device may be provided with a display mounted in a housing. The display may have an array of pixels that form an active area and may have an inactive area that runs along an edge of the active area. An opaque layer may be formed on an inner surface of a display cover layer in the inactive area of the display or may be formed on another transparent layer in the electronic device. An ambient light sensor window may be formed from the opening and may be aligned with color ambient light sensor. The ambient light sensor may have an integrated circuit with an array of photodetectors and may have a color filter layer forming a corresponding array of thin-film interference color filters with different respective pass bands. The color filter layer may have a shared dielectric stack and multiple color-filter-specific dielectric stacks on the shared dielectric stack.

22 Claims, 6 Drawing Sheets

ELECTRONIC DEVICES HAVING LIGHT SENSORS WITH THIN-FILM FILTERS

FIELD

This relates generally to electronic devices, and, more particularly, to electronic devices with optical components.

BACKGROUND

Electronic devices such as laptop computers, cellular telephones, and other equipment are sometimes provided with optical components. For example, an electronic device may have an ambient light sensor, an optical proximity sensor, image sensors, light sources, and other optical components.

It may sometimes be desirable to provide optical components with wavelength-dependent optical filters. For example, it may be desired to pass one color of light to a light sensor while blocking other colors of light. Organic color filters such as polymer layers with colored dye can be used in filtering light, but may not exhibit desired wavelength selectivity.

SUMMARY

A color ambient light sensor may have an integrated circuit with an array of photodetectors and may have a color filter layer forming a corresponding array of thin-film interference color filters with different respective pass bands. One or more diffuser layers may be interposed between the ambient light sensor window and the array of photodetectors. One or more infrared-light-blocking filters may be interposed between the diffuser layers and the array of photodetectors.

The color filter layer on the integrated circuit in the color ambient light sensor may have a shared dielectric stack and multiple color-filter-specific dielectric stacks on the shared dielectric stack. The shared dielectric stack may overlap the array of photodetectors. The color-filter-specific dielectric stacks and corresponding portions of the shared dielectric stack that are overlapped by each of the color-filter-specific dielectric stacks form respective color filters with different respective pass bands. This allows the color filters to selectively pass different colors of light to multiple different respective photodetectors in the integrated circuit.

An electronic device may be provided with a display mounted in a housing. The display may have an array of pixels that form an active area and may have an inactive area that runs along an edge of the active area. An opaque layer may be formed on an inner surface of a display cover layer in the inactive area of the display or may be formed on another transparent layer in the electronic device. An optical component window such as an ambient light sensor window may be formed from the opening and may be aligned with an optical component such as the color ambient light sensor.

DETAILED DESCRIPTION

Electronic devices may be provided with optical components. The optical components may include optical filters. The optical filters may include, for example, bandpass filters that pass different colors of light to an optical component such as a color ambient light sensor.

Figure 1:
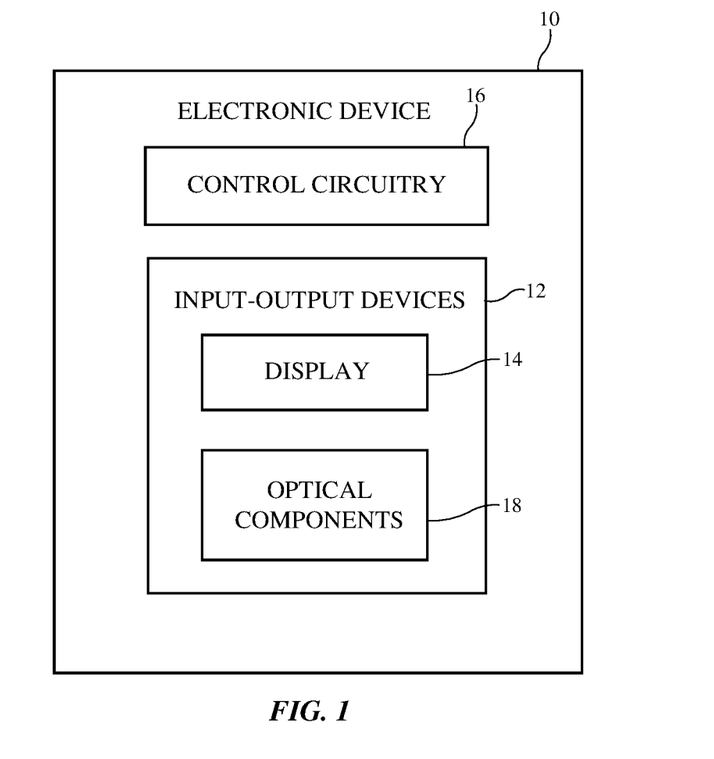
FIG. 1 is a schematic diagram of an illustrative electronic device having optical components in accordance with an embodiment.

An illustrative electronic device of the type that may be provided with optical components is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Device 10 may have input-output circuitry such as input-output devices 12. Input-output devices 12 may include user input devices that gather user input and output components that provide a user with output. Devices 12 may also include communications circuitry that receives data for device 10 and that supplies data from device 10 to external devices and may include sensors that gather information from the environment.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may be a liquid crystal display, a light-emitting diode display (e.g., an organic light-emitting diode display), an electrophoretic display, or other display.

Input-output devices 12 may include optical components 18. Optical components 18 may include ambient light sensors (e.g., color ambient light sensors configured to measure ambient light color and intensity by making light measurements with multiple light detector channels each of which has a corresponding color filter and photodetector to measure light in a different wavelength band), optical proximity sensors (e.g., sensors with a light-emitting device such as an infrared light-emitting diode and a corresponding light detector such as an infrared photodiode for detecting when an external object that is illuminated by infrared light from the light-emitting diode is in the vicinity of device 10), a visible light camera, an infrared light camera, light-emitting diodes that emit flash illumination for visible light cameras, infrared light-emitting diodes that emit illumination for infrared cameras, and/or other optical components.

In addition to optical components 18, input-output devices 12 may include buttons, joysticks, scrolling wheels, touch pads, key pads, keyboards, microphones, speakers, tone generators, vibrators, cameras, light-emitting diodes and other status indicators, non-optical sensors (e.g., temperature sensors, microphones, capacitive touch sensors, force sensors, gas sensors, pressure sensors, sensors that monitor device orientation and motion such as inertial measurement units formed from accelerometers, compasses, and/or gyroscopes), data ports, etc. A user can control the operation of device 10 by supplying commands through input-output devices 12 and may receive status information and other output from device 10 using the output resources of input-output devices 12.

Figure 2:
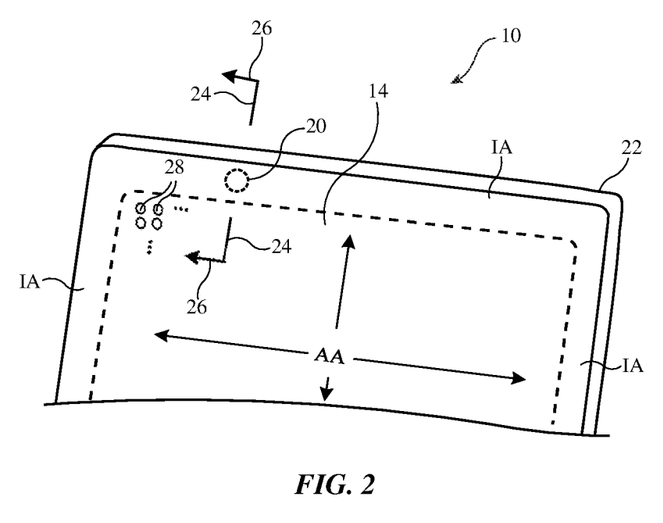
FIG. 2 is a perspective view of a portion of an electronic device display having an optical component window overlapping an optical component in accordance with an embodiment.

Device 10 may have a housing. The housing may form a laptop computer enclosure, an enclosure for a wristwatch, a cellular telephone enclosure, a tablet computer enclosure, or other suitable device enclosure. A perspective view of a portion of an illustrative electronic device is shown in FIG. 2. In the example of FIG. 2, device 10 includes a display such as display 14 mounted in housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer (e.g., a transparent planar member that forms some or all of a front face of device 10 or that is mounted in other portions of device 10). Openings may be formed in the display cover layer. For example, an opening may be formed in the display cover layer to accommodate a button, a speaker port, or other components. Openings may be formed in housing 22 to form communications ports (e.g., an audio jack port, a digital data port, etc.), to form openings for buttons, etc. In some configurations, housing 22 may have a rear housing wall formed from a planar glass member or other transparent layer (e.g., a planar member formed on a rear face of device 10 opposing a front face of device 10 that includes a display cover layer). The planar member forming the rear housing wall may have an interior surface that is coated with an opaque masking layer.

Display 14 may have an array of pixels 28 in active area AA (e.g., liquid crystal display pixels, organic light-emitting diode pixels, electrophoretic display pixels, etc.). Pixels 28 of active area AA may display images for a user of device 10. Active area AA may be rectangular or may have other suitable shapes.

Inactive portions of display 14 such as inactive border area IA may be formed along one or more edges of active area AA. Inactive border area IA may overlap circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink (e.g., polymer containing black dye and/or black pigment, opaque materials of other colors, etc.) and/or other layers (e.g., metal, dielectric, semiconductor, etc.). Opaque masking materials such as these may also be formed on an inner surface of a planar rear housing wall formed from glass, ceramic, polymer, crystalline transparent materials such as sapphire, or other transparent material.

Optical components (e.g., a camera, a light-based proximity sensor, an ambient light sensor, status indicator light-emitting diodes, camera flash light-emitting diodes, etc.) may be mounted under one or more optical component windows such as optical component window 20 of FIG. 2. In the example of FIG. 2, optical component window 20 is formed in inactive area IA of display 14 (e.g., an inactive border area in a display cover layer). If desired, optical component windows such as window 20 may be formed in other portions of device 10 such as portions of a rear housing wall formed from a transparent member coated with opaque masking material. Arrangements in which optical component windows such as window 20 are formed in portions of a display cover layer for display 14 may sometimes be described herein as examples.

In an arrangement of the type shown in FIG. 2, one or more openings for one or more respective optical component windows such as optical component window 20 may be formed in the opaque masking layer of inactive area IA to accommodate the optical components. A partially transparent layer (e.g., a layer of polymer containing dye and/or pigment such as a layer of black ink) and other structures may optionally overlap the openings to adjust the appearance of the optical component windows (e.g., to adjust the appearance of the optical component windows so that the optical component windows have appearances that match the surrounding opaque masking layer).

Optical component windows may, in general, include any suitable layer(s) of material (e.g., inorganic and/or organic thin-film layers, partially transparent metal films, dielectric coating layers such as thin-film interference filter coatings formed from stacks of dielectric layers, etc.). These layers of material may be formed within an opening in a layer of opaque masking material.

Figure 3:
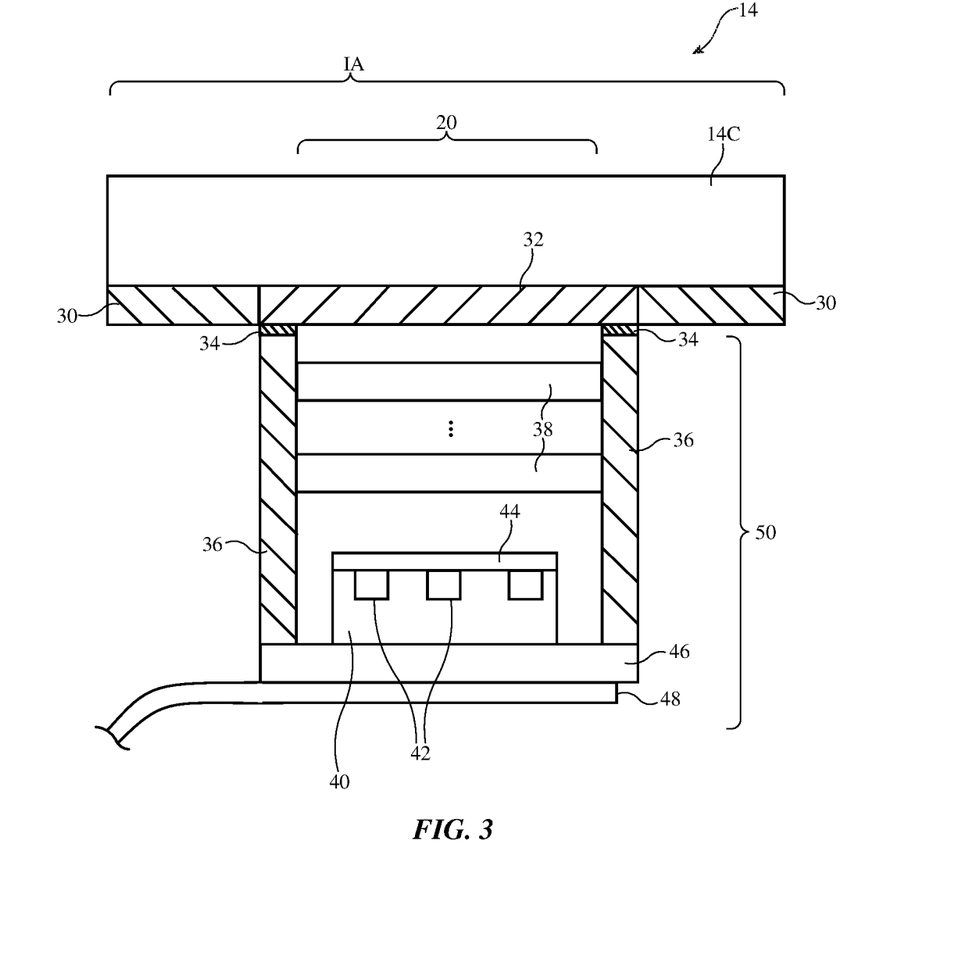
FIG. 3 is a cross-sectional side view of an illustrative optical component window overlapping an optical component such as a color ambient light sensor in accordance with an embodiment.

FIG. 3 is a cross-sectional side view of display 14 of FIG. 2 taken along line 24 through optical component window 20 and viewed in direction 26 of FIG. 2. As shown in FIG. 3, display 14 may have a display cover layer such as display cover layer 14C. Display cover layer 14C may be formed from clear glass, transparent polymer, transparent crystalline material such as sapphire, transparent ceramic, and/or other suitable transparent material. Display cover layer 14C may have a portion that covers active area AA of display 14 and a portion such as the portion shown in FIG. 3 that covers inactive area IA. Layer 14C may be formed from glass, plastic, ceramic, sapphire, or other transparent materials and may be a part of display 14 or a separate protective layer that covers active display structures.

Window 20 may be formed from an opening in opaque masking layer 30. Opaque masking layer 30 may be formed from polymer containing dye and/or pigment (e.g., black ink) and/or other opaque material on the inner surface of display cover layer 14C in inactive area IA. The opening associated with window 20 may be left free of overlapping coatings or may be covered with one or more overlapping layers such as layer 32 to adjust the outward appearance of optical component window 20. Layer(s) 32 may be, for example, a layer of polymer containing dye and/or ink having a light transmission of about 1-10%, at least 2%, at least 0.5%, at least 1.5%, less than 7%, less than 5%, less than 3%, etc. If desired, optical component windows may be formed in housing walls and/or other structures in device 10. The example of FIG. 3 is merely illustrative.

Any suitable optical component 18 that emits and/or detects light (e.g., an ambient light sensor, an optical proximity sensor, an image sensor, a light-emitting diode or other light source, etc.) may be aligned with window 20. As shown in FIG. 3, for example, an optical component such as color ambient light sensor 50 may be formed in alignment with optical component window 20 (sometimes referred to as an ambient light sensor window) in display 14.

Display 14 has an array of pixels overlapped by display cover layer 14C in an active area (AA) of display 14 (not shown in FIG. 3). In inactive area IA, portions of the underside of display cover layer 14C may be coated with opaque masking layer 30 (e.g., black ink, etc.) and an opening in layer 30 may be covered with optional partially transparent layers such as layer 32 to help visually match the appearance of window 20 to the visual appearance of surrounding portions of display cover layer 14C (e.g., to match the appearance of opaque masking layer 30) while still allowing ambient light sensor 50 to measure ambient light.

Color ambient light sensor 50 may include support structures such as support structure 36 (sometimes referred to as a sensor wall, a sensor body structure, a sensor housing structure, etc.). A ring or patch of adhesive such as pressure sensitive adhesive layer 34 may be used to couple support structure 36 to the underside of display cover layer 14C in alignment with optical component window 20. Support structure 36 may form walls that surround optical layers 38. Optical layers 38 may include one or more light diffuser layers that diffuse incoming ambient light and/or may include one or more visible-light-transmitting-and-infrared-light-blocking filters (sometimes referred to as infrared-light-blocking filters or infrared-blocking filters). With one illustrative configuration, the diffuser layer(s) may be mounted between layer 32 and the infrared-blocking filter(s), so that the infrared-blocking filter(s) are between light-detector integrated circuit 40 and the light diffuser layer(s). If desired, other optical layers may be included in layers 38. Ambient light traveling through window 20 (e.g., through layer 14C, layer 32, and layers 38) may be detected using photodetectors 42 in light detector integrated circuit 40. Control circuitry 16 (FIG. 1) can use measurements from integrated circuit 40 to determine the color and intensity of ambient light.

Viewed from above through layer 14C, support structure 36 may extend around the periphery of optical window 20 (e.g., with a footprint that is circular, oval, rectangular, or other suitable shape). Support structure 36 may be formed from an opaque material that blocks visible and infrared light such as black plastic and/or other opaque materials. Support structure 36 may be used to form a one-piece or a multi-piece housing for sensor 50. In the example of FIG. 3, support structure 36 is a single member having an upper region in which optical layers 38 are mounted and a lower region in which light detector integrated circuit 40 is mounted.

Light detector integrated circuit 40 may be formed from a silicon die or other semiconductor die. Wire bonds, through-silicon vias and solder joints, or other conductive paths may be used in coupling the circuitry of light detector integrated circuit 40 to contact pads on printed circuit 46. Solder joints or other electrical connections may be used to couple signal paths formed from metal traces in flexible printed circuit 48 to signal paths in printed circuit 46 (e.g., signal paths formed from metal lines in printed circuit 46 that are coupled to the circuitry of integrated circuit 40). In this way, the circuitry of light detector integrated circuit 40 may be coupled to the signal paths in flexible printed circuit 48 so that these signal paths may route signals to and from control circuitry 16.

Light detector integrated circuit 40 may include multiple photodetectors 42 (e.g., photodiodes). Each photodetector 42 may be overlapped by a respective color filter in color filter layer 44. Each color filter may be formed from a thin-film interference filter (e.g., a stack of thin-film dielectric layers of alternating refractive index) that selectively passes a desired range of wavelengths (e.g., a pass band of a desired color) to an associated overlapped photodetector 42. For example, a red-pass color filter may overlap a first photodetector 42 to form a red-light-sensing channel in ambient light sensor 50, a blue-pass color filter may overlap a second photodetector 42 to form a blue-light-sensing channel in ambient light sensor 50, etc. The thin-film interference color filters of layer 44 may be configured to block infrared light (e.g., stray infrared light that has not been blocked by the infrared-blocking filter(s) in optical layers 38).

Figure 4:
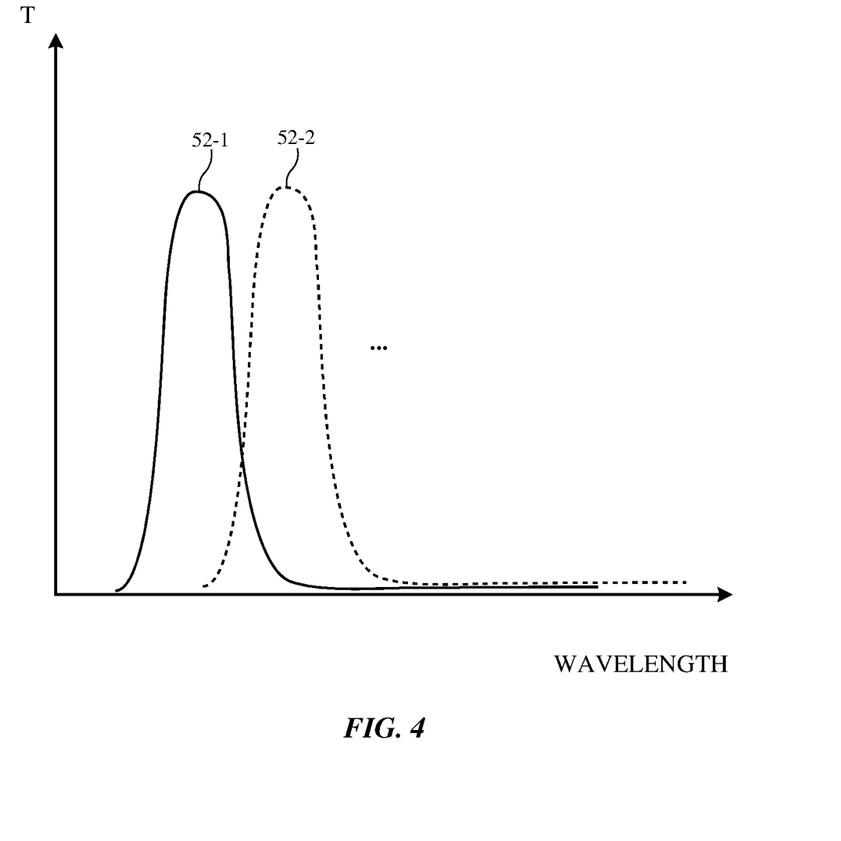
FIG. 4 is a graph in which light transmittance has been plotted as a function of wavelength for an illustrative set of ambient light sensor color filters in accordance with an embodiment.

Light transmission curves 52-1 and 52-2 of FIG. 4 represent illustrative light transmission characteristics (bandpass characteristics) for first and second respective color filters in color filter layer 44. Curve 52-1 may, as an example, be associated with a pass band for a blue color filter and may cover a range of blue wavelengths, whereas curve 52-2 may be a pass band associated with a green color filter and may cover a range of green wavelengths (as an example). Infrared wavelengths may be blocked.

Figure 5:
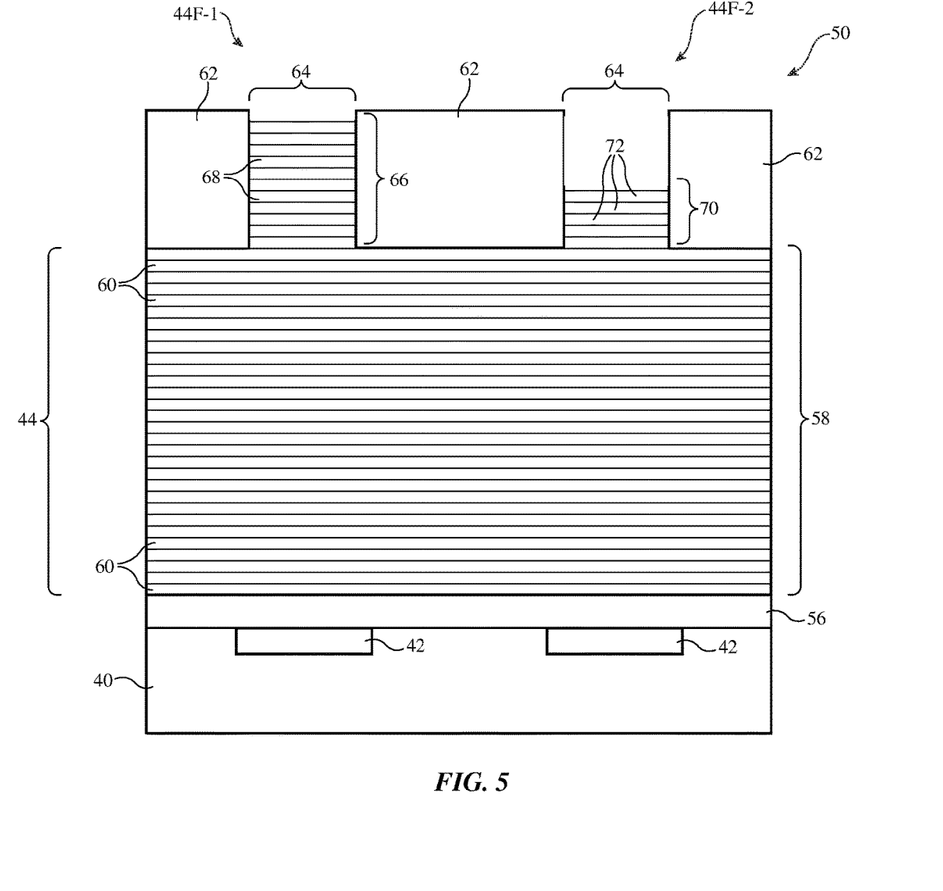
FIG. 5 is a cross-sectional side view of patterned dielectric thin-film layers used in forming thin-film interference filter structures for color ambient light sensor color filters in accordance with an embodiment.

FIG. 5 is a cross-sectional side view of a portion of ambient light sensor 50 including light detecting integrated circuit 40. As shown in FIG. 5, photodetectors 42 may be formed in a semiconductor die (e.g., a silicon die) that forms integrated circuit 40. Photodetectors 42 may be arranged in a rectangular grid (e.g., an array having N rows and M columns, where N and M have values of 1-30, at least 1, at least 2, at least 3, fewer than 25, fewer than 20, or other suitable values), may be arranged in a circular layout (e.g., wedges or rectangles surrounding a central point), and/or may be organized using other patterns. Different photodetectors 42 may be overlapped by thin-film interference color filters of different colors (different pass bands). For example, the photodetector 42 of FIG. 5 that is on the left side of FIG. 5 may be overlapped by color filter 44F-1 and the photodetector 42 that is on the right side of FIG. 5 may be overlapped by color filter 44F-2, which has a different pass and than color filter 44F-1.

In some configurations, there may be multiple photodetectors associated with each color (e.g., a set of 2-10 red photodetectors, a set of 2-10 blue color filters, etc.) to provide light detector circuitry 40 with redundancy and enhanced immunity to shadowing by external objects.

In general, each color filter (or each set of multiple color filters) in color filter layer 44 may be configured to pass light of a different color (e.g., a range of wavelengths in a blue band of wavelengths, green light associated with a band of green wavelengths, red light, etc.). In this way, light readings for multiple color channels (e.g., red, green, blue, etc.) may be gathered by ambient light sensor 50 and used to measure the color and intensity of ambient light. If desired, color filter layer 44 may also include a clear color filter for a clear color channel (e.g., a color filter that passes white visible light and blocks infrared light).

Photodetectors for different color channels and, if desired, redundant photodetectors (e.g., photodetectors measuring the same color of ambient light) can be distributed throughout sensor 50 in any suitable pattern. As an example, photodetectors 42 of FIG. 5 may include an array of photodetectors for 3-10 different color channels (e.g., photodetectors overlapped by 3-10 different color filters with 3-10 respective different pass bands including an optional clear color channel) and each color channel may have 1-5 different individual photodetectors 42 for gathering ambient light color readings for that color channel. Circuitry in integrated circuit 40 (e.g., switching circuitry, amplifier circuitry, analog-to-digital conversion circuitry, communications circuitry for supporting communications with control circuitry elsewhere in device 10, etc.) may be incorporated into integrated circuit 40 for gathering signals from photodetectors 42 or, if desired, some or all of this supporting circuitry for photodetectors 42 may be formed in one or more integrated circuits that are separate from integrated circuit 40.

Photodetectors 42 may be formed at the top of integrated circuit 40 and may be covered with encapsulation layer 56. Encapsulation layer 56 may include one or more layers of dielectric (e.g., one or more organic layers such as polymer layers, one or more inorganic dielectric layers such as layers of silicon nitride, etc.) and may be used to help prevent exposure of photodetectors 42 to moisture and oxygen.

Color filter layer 44 may include a dielectric stack such as dielectric stack 58 that is common to each of the color filters of color ambient light sensor 50. Dielectric stack 58 is formed from dielectric layers 60. Layers 60 may have index of refraction values that alternate in successive layers (e.g., layers that alternate between higher refractive index layers and lower refractive index layers). Layers 60 of dielectric stack 58 may overlap all photodetectors 42 in integrated circuit 40, so dielectric stack 58 may sometimes be referred to as a common dielectric stack or shared dielectric stack.

Each thin-film interference color filter also has a color-filter-specific dielectric stack that, in conjunction with the dielectric layers of common stack 58 provides that color filter with a desired bandpass characteristic. For example, color filter 44F-1 includes color-filter-specific dielectric stack 66 formed on top of common stack 58 and color filter 44F-2 includes color-filter-specific dielectric stack 70 on top of a different portion of common stack 58. Each color filter in layer 44 may have a corresponding color-filter-specific dielectric stack that operates in conjunction with an overlapped portion of common dielectric stack 58 to provide that color filter with its desired bandpass characteristic (e.g., all of the dielectric layers including both the layers of dielectric stack 58 and the overlapping color-filter-specific dielectric stack participate in forming the desired bandpass characteristic). In arrangements in which each color channel includes multiple redundant photodetectors 42 covered by color filters of the same color, the color-filter-specific dielectric stack 70 in each of these color filters will generally be identical. Because there are multiple different color channels in sensor 50, there are multiple different color-filter-specific dielectric stacks on common stack 60.

Each color-filter-specific dielectric stack in color filter layer 40 includes dielectric layers. The dielectric layers of the color-filter-specific dielectric stacks may have index of refraction values that alternate in successive layers (e.g., layers that alternate between higher refractive index layers and lower refractive index layers). In the example of FIG. 5, color filter 44F-1 has a stack 66 of dielectric layers 68 on common stack 58 and color filter 44F-2 has a stack 70 of dielectric layers 70 on common stack 58. To preserve alternation in the refractive index values of the dielectric layers of each color filter, the refractive index of the layers can alternate between the uppermost layer of stack 58 and the immediately adjacent lowermost layer of each color-filter-specific dielectric stack. For example, if the uppermost layer 60 of stack 58 has a higher index of refraction value, the lowermost layer 68 of stack 66 and the lower most layer 72 of stack 70 may have a lower index of refraction value. If the uppermost layer 60 has a high index, the lowermost layer 68 and the lowermost layer 72 may have a low index. This alternation in index value at the interface between common dielectric stack 58 and the overlapping stacks helps ensure that the combined stacks formed by each color-filter-specific dielectric stack and the respective overlapped portion of common dielectric stack 58 each operate effectively as a respective thin-film interference color filter.

The dielectric layers of stack 58 and color-filter-specific stacks such as stacks 66 and 70 may be formed from organic dielectric (e.g., polymer) and/or inorganic dielectric. These dielectric layers may, for example, be formed from inorganic dielectric materials such as silicon oxide, silicon nitride, niobium oxide, tantalum oxide, titanium oxide, aluminum oxide, other metal oxides, etc. There may be any suitable number of dielectric layers in each dielectric stack (e.g., at least 5, at least 10, at least 30, at least 40, 20-90, 10-120, 30-120, 20-120, fewer than 100, etc.), so each color filter may have at least 5 layers, at least 10 layers, at least 30 layers, at least 40 layers, at least 70 layers, at least 100 layers, fewer than 200 layers, fewer than 150 layers, 10-120 layers, 30-120 layers, 20-120 layers, 40-200 layers, or other suitable number of layers).

Opaque material such as opaque layer 62 may have a mesh shape with an array of openings 64 aligned with respective color filters. Layer 62 may be used to help reduce crosstalk due to light leakage between adjacent channels. Layer 62 may be formed from an organic material (e.g., polymer containing black ink or black dye) and/or inorganic opaque structures.

Figure 6:
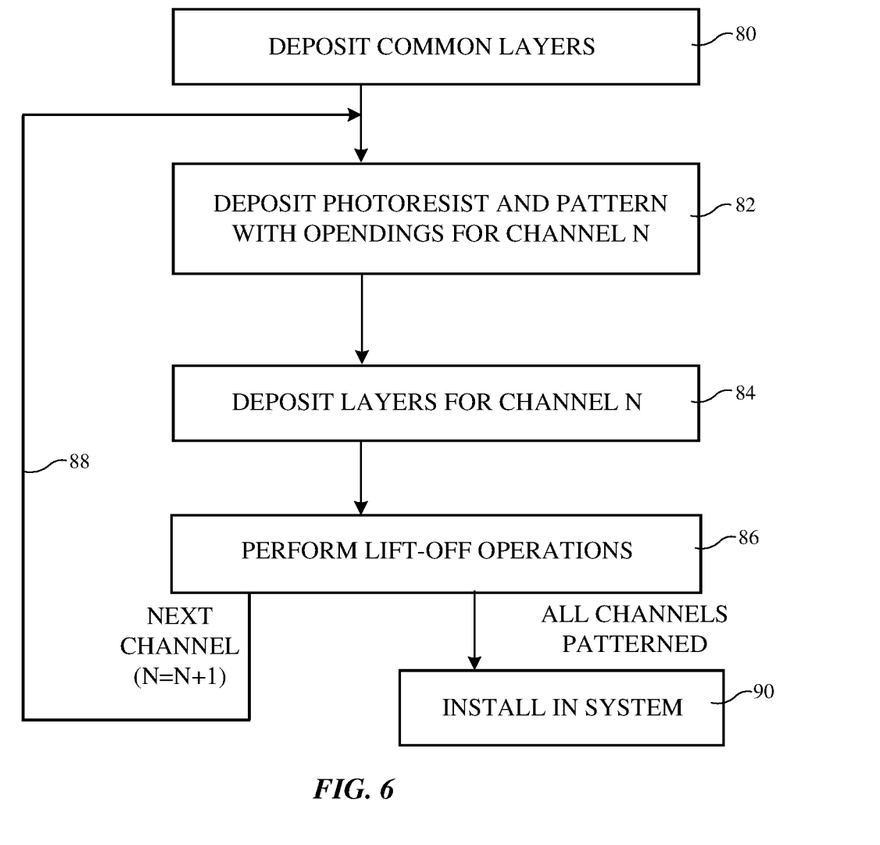
FIG. 6 is a flow chart of illustrative operations involved in forming thin-film interference color filters using thin-film dielectric layers in accordance with an embodiment.

FIG. 6 is a flow chart of illustrative operations involved in forming a color filter layer such as color filter layer 44 of FIG. 5 for ambient light sensor 50. In selecting the refractive indices and thicknesses of the layers in each color filter, the thicknesses (and, if desired, the materials and refractive indices) of each color-filter-specific dielectric stack can be chosen individually for that color-filter-specific dielectric stack to configure the color filter associated with that color-filter-specific dielectric stack for bandpass filter performance in a particular color band, whereas the refractive index values and thicknesses of layers 60 in the common portion of the color filters (common stack 58) are necessarily shared by all of the color filters. The use of a common dielectric stack such as common dielectric stack 58 can help reduce processing time, because the time associated with depositing the layers in stack 58 is shared between multiple color filters. Moreover, each of the color-filter-specific stacks is shorter (has less height above the surface of common stack 58) than would be possible if common stack 58 were omitted, which makes it possible to form smaller gaps between adjacent color filters during fabrication (e.g., during lift-off operations). Smaller gaps between color filters help reduce dead space and allow more photodetectors to be formed for enhanced redundancy (e.g., for enhanced immunity to external object shadowing).

During the operations of block 80, a physical vapor deposition tool such as a sputtering tool or other equipment is used to deposit layers 60 of common dielectric stack 58 (FIG. 5). During formation of stack 58 on the surface of integrated circuit 40 (e.g., on encapsulant layer 56 in the example of FIG. 5), the material that is being deposited (e.g., inorganic dielectric material) can be alternated between layers 60, so that the refractive index of successive layers varies between a higher value (e.g., the refractive index of niobium oxide or other higher index material) and a lower value (e.g., the refractive index of silicon oxide or other lower index material).

After forming common stack 58, multiple different color-filter-specific dielectric stacks may be formed on sensor 50. In general, any suitable fabrication technique (shadow-mask deposition, etching using photomasks, etc.) may be used in forming patterned dielectric stacks on sensor 50. With one illustrative configuration, which is described herein as an example, lift-off fabrication techniques are used.

With a lift-off process, a photoresist layer may be deposited on the surface of common stack 58 (block 82). During the operations of block 82, this photoresist may be patterned using photolithography to produce a pattern of openings for the desired locations of the color filters of channel N of the ambient light sensor. After forming the patterned photoresist layer on stack 58, dielectric layers for the color-filter-specific dielectric stack of the Nth channel may, during the operations of block 84, be deposited in the patterned openings of the photoresist (e.g., directly on the exposed uppermost layer 60 of stack 58). Lift-off operations may then be performed to remove the deposited dielectric layers from all areas of integrated circuit 40 other than the areas associated with the openings in the photoresist (e.g., all areas except where the color-specific-dielectric stacks for the Nth channel color filters are located).

As indicated by line 88, the operations of blocks 82, 84, and 86 may be repeated for different channels (e.g., channel N+1, channel N+2, etc.). As each set of color-filter-specific dielectric stacks is deposited, the color filters for a different respective color channel are formed. Once all desired color filters are formed, ambient light sensor 50 may be installed in support structures 36 and mounted within device 10 (e.g., in alignment with optical window 20 of FIG. 3).

During operation of device 10, ambient light sensor measurements from ambient light sensor 50 may be used to control the operation of device 10. For example, control circuitry 16 may adjust the intensity of images displayed on display 14 in response to measured changes in the intensity of ambient light. If, as an example, a user moves device 10 to a bright outdoors environment from a dark interior environment, control circuitry 16 may increase the brightness of display 14 to overcome glare. Color changes (e.g., white point adjustments) can also be made based on ambient light sensor measurements. If, for example, ambient light color measurements indicate that ambient lighting has become warm (e.g., when a user moves device 10 indoors from a cold outdoor lighting environment), the white point of display 14 can be adjusted by control circuitry 16 so that display 14 displays corresponding warmer content.

The foregoing is merely illustrative and various modifications can be made to the described embodiments. The foregoing embodiments may be implemented individually or in any combination.

What is claimed is:

1. An electronic device, comprising:
a display;
a color ambient light sensor; and
control circuitry configured to adjust the display based on ambient light color and ambient light intensity information from the color ambient light sensor, wherein the color ambient light sensor comprises:
a light detector integrated circuit having first and second photodetectors; and
a color filter layer on the light detector integrated circuit, wherein the color filter layer has a first thin-film interference color filter overlapping the first photodetector and a second thin-film interference color filter overlapping the second photodetector, the first thin-film color filter has a first pass band associated with a first color, the second thin-film color filter has a second pass band associated with a second color, the color filter layer has a common dielectric stack that overlaps the first and second photodetectors and has first and second color-filter-specific dielectric stacks formed on the common dielectric stack, the first thin-film interference color filter includes the first color-specific dielectric stack and a first portion of the common dielectric stack, and the second thin-film interference color filter includes the second color-filter-specific dielectric stack and a second portion of the common dielectric stack that is different from the first portion.

2. The electronic device defined in claim 1 wherein the common dielectric stack and the color-filter-specific dielectric stacks are formed from inorganic dielectric layers.

3. The electronic device defined in claim 2 wherein the display has an active area with an array of pixels, an inactive area without pixels, and a display cover layer overlapping the active area and the inactive area and wherein the color ambient light sensor is overlapped by the inactive area.

4. The electronic device defined in claim 3 further comprising:
an opaque masking layer on a surface of the display cover layer in the inactive area; and
an ambient light sensor window formed from an opening in the opaque masking layer that is aligned with the color ambient light sensor.

5. The electronic device defined in claim 2 wherein the inorganic dielectric layers comprise silicon oxide.

6. The electronic device defined in claim 5 wherein the inorganic dielectric layers comprise inorganic dielectric layers selected from the group consisting of: niobium oxide layers, tantalum oxide layers, titanium oxide layers, silicon nitride layers, and aluminum oxide layers.

7. The electronic device defined in claim 2 wherein the first and second thin-film interference color filters each have 30-120 of the dielectric layers.

8. The electronic device defined in claim 1 further comprising an encapsulant layer overlapping the first and second photodetectors, wherein the common dielectric stack is interposed between the first and second color-filter-specific dielectric stacks and the encapsulant layer.

9. The electronic device defined in claim 1 further comprising an opaque polymer patterned to form an array of openings, wherein the array of openings comprises a first opening aligned with the first color-filter-specific dielectric stack and a second opening aligned with the second color-filter-specific dielectric stack.

10. The electronic device defined in claim 1 wherein the color filter layer has a third thin-film interference color filter with a third pass band associated with a third color.

11. An electronic device, comprising:
a housing;
a display coupled to the housing, wherein the display has an ambient light sensor window; and
a color ambient light sensor in alignment with the ambient light sensor window, wherein the color ambient light sensor has an integrated circuit with first and second photodetectors and a color filter layer overlapping the first and second photodetectors, wherein the color filter layer includes first and second thin-film interference color filters, wherein the first thin-film interference color filter overlaps the first photodetector and is configured to pass light in a first band of wavelengths, wherein the second thin-film interference color filter overlaps the second photodetector and is configured to pass light in a second band of wavelengths, wherein the color filter layer has a shared dielectric stack that overlaps the first and second photodetectors and has first and second color-filter-specific dielectric stacks formed on the shared dielectric stack, wherein the first thin-film interference color filter comprises the first color-filter-specific dielectric stack and a first portion of the shared dielectric stack, and wherein the second thin-film interference color filter comprises the second color-filter-specific dielectric stack and a second portion of the shared dielectric stack that is laterally offset from the first portion.

12. The electronic device defined in claim 11 further comprising a light diffuser layer configured to pass ambient light to the color ambient light sensor.

13. The electronic device defined in claim 12 further comprising an infrared-light-blocking filter interposed between the light diffuser layer and the color filter layer.

14. The electronic device defined in claim 11 wherein the shared dielectric stack has a plurality of inorganic dielectric layers of alternating refractive index.

15. The electronic device defined in claim 14 wherein each of the first and second color-filter-specific dielectric stacks is formed directly on the shared dielectric stack and has a plurality of inorganic dielectric layers of alternating refractive index.

16. The electronic device defined in claim 11 wherein the shared dielectric stack has 20-120 inorganic dielectric layers of alternating refractive index.

17. The electronic device defined in claim 16 wherein each of the first and second color-filter-specific dielectric stacks has 20-120 inorganic dielectric layers of alternating refractive index.

18. An ambient light sensor, comprising:
a light detector integrated circuit having first and second photodetectors; and
a color filter layer overlapping the first and second photodetectors, wherein the color filter layer has:
a shared dielectric stack that overlaps the first and second photodetectors,
a first color-filter-specific dielectric stack formed directly on the shared dielectric stack, wherein the first color-filter-specific dielectric stack and a first portion of the shared dielectric stack that is overlapped by the first color-filter-specific dielectric stack forms a first color filter that passes light in a first wavelength band to the first photodetector, and
a second color-filter-specific dielectric stack formed directly on the shared dielectric stack, wherein the second color-filter specific dielectric stack and a second portion of the shared dielectric stack that is laterally separated from the first portion forms a second color filter that passes light in a second wavelength band to the second photodetector.

19. The ambient light sensor defined in claim 18 wherein the shared dielectric stack has at least 20 inorganic dielectric layers of alternating refractive index.

20. The ambient light sensor defined in claim 19 wherein each of the first and second color-filter-specific dielectric stacks has at least 20 inorganic dielectric layers of alternating refractive index.

21. The electronic device defined in claim 1, wherein the first color-filter-specific dielectric stack is separated from the second color-filter-specific dielectric stack.

22. The electronic device defined in claim 1, wherein the first color-filter-specific dielectric stack has more dielectric layers than the second color-filter-specific dielectric stack.

* * * * *